G. H. BOLDUC.
CAR FENDER AND WHEEL GUARD.
APPLICATION FILED DEC. 6, 1909.
1,039,086.
Patented Sept. 24, 1912.
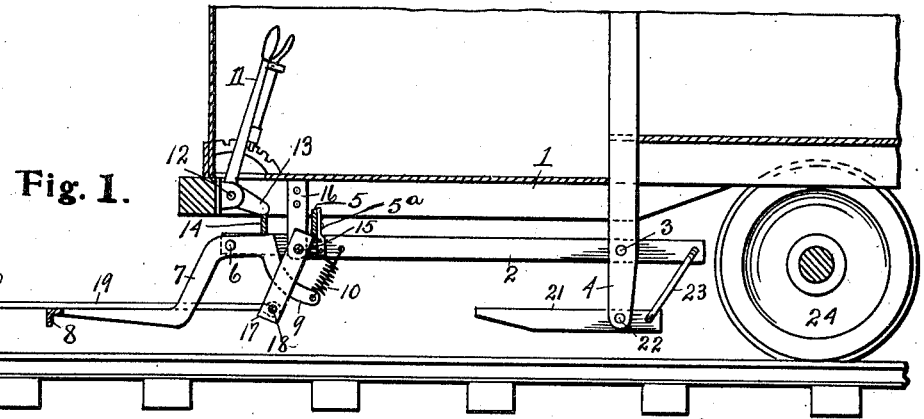
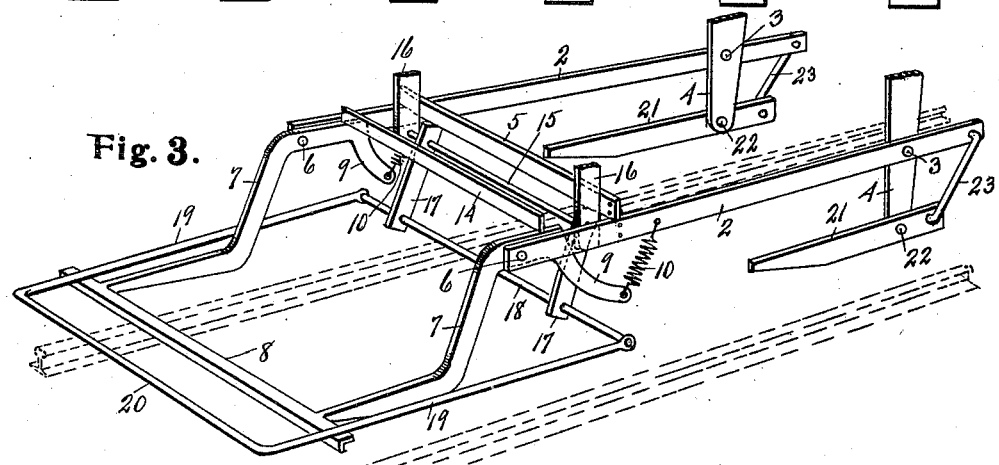
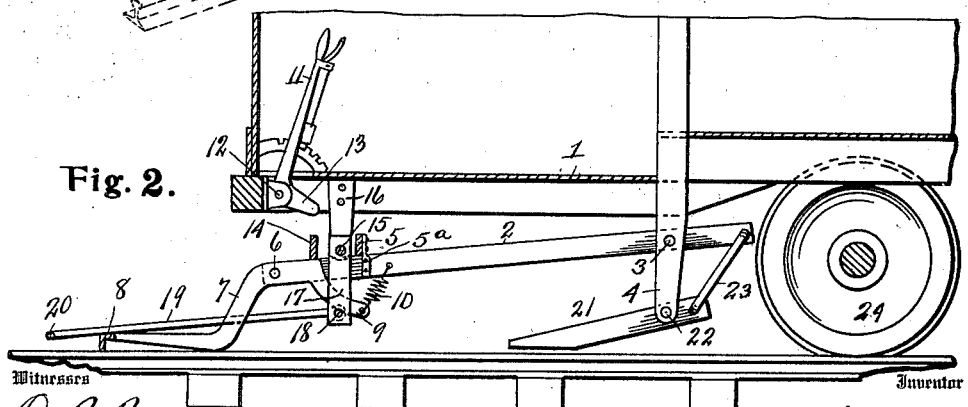

UNITED STATES PATENT OFFICE.

GEORGE H. BOLDUC, OF DETROIT, MICHIGAN.

CAR-FENDER AND WHEEL-GUARD.

1,039,086.         Specification of Letters Patent.     Patented Sept. 24, 1912.

Application filed December 6, 1909. Serial No. 531,519.

*To all whom it may concern:*

Be it known that I, GEORGE H. BOLDUC, a citizen of the Dominion of Canada, residing at Detroit, in the county of Wayne, State of Michigan, have invented certain new and useful Improvements in Car-Fenders and Wheel-Guards; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a car fender and wheel guard, especially designed for use in connection with street cars, and consists in the construction and arrangement of parts hereinafter more fully set forth and pointed out particularly in the claims.

The object of the invention is to provide an automatic safety fender for street cars which will fall upon encountering an object upon the track and prevent the passage of said object thereunder, the arrangement being such as to actuate wheel guards simultaneously with the dropping of the fender to throw them into contact with the rails of the tracks in advance of the wheels, provision also being made for swinging the fender to raise or lower the forward end thereof by means of a lever under the control of the motorman.

The above object is attained by the mechanism illustrated in the accompanying drawings, in which:—

Figure 1 is a fragmentary view in section through the forward end of a car frame, provided with my improved fender and wheel guard, showing the parts in their normal position. Fig. 2 is a similar view showing the fender tripped and the wheel guard depressed in front of the wheel. Fig. 3 is a perspective view of the fender frame and parts connected therewith.

Referring to the characters of reference, 1 designates the frame of the car from which the fender frame is hung. Said fender frame consists of the side bars 2, which, near their rear ends, are pivoted at 3 to the hangers 4 depending from the frame of the car. The side bars 2 near their forward ends are connected by the cross bar 5 through the medium of the cleats 5ª. Pivotally hung at 6 between the extreme forward ends of the side bars are the forwardly and downwardly curved side pieces 7 of the fender proper, whose forward ends project horizontally and are connected by the angle bar 8. The rear ends of the side pieces 7 are provided with the arms 9 which curve rearwardly and downwardly and whose rear ends are connected by the springs 10 with the side bars 2. These springs 10 in conjunction with the weight of the side pieces 7 of the fender, serve to create a tendency for the forward end of the fender to swing downwardly. To overcome said tendency and maintain the front end of the fender the proper distance above the track, a lever 11 is employed which is fulcrumed at 12 on the car frame, and is provided with a short arm 13 adapted to impinge upon the cross bar 14 which connects the inner ends of the side pieces 7. By causing the arm 13 of said lever to exert a downward pressure on the cross bar 14, the side pieces may be swung upon their pivots 6 so as to raise the forward end of the fender, as shown in Fig. 1.

To suspend the forward end of the fender frame in a position so that it may be tripped to cause it to fall when encountering an object upon the track, a transverse shaft 15 is employed which is pivotally mounted in the hangers 16 depending from the frame of the car. Mounted upon said shaft to swing therewith are the trip arms 17 through which said shaft passes near the upper ends thereof. Connecting the lower ends of the trip arms is a rod 18 whose ends are pivoted to the rear ends of the side portions 19 of the trip bar 20 which crosses in front of the fender and connects the forward ends of said side portions, which are supported by and adapted to slide upon the ends of the angle bar 8 at the front of the fender.

In practice the side pieces 7 of the fender will be connected by cross bars or a lattice work to form a support for an object falling on the fender. These slats, however, have been omitted from this drawing to more readily show the other features of construction.

It will be noted that the shaft 15 is supported by and journaled in the hangers 16 attached to the frame of the car. To support the forward end of the fender frame, said frame is raised to carry the cross bar 5 thereon above the ends of the trip arms 17 when the shaft 15 is rocked to swing the upper ends of said arms under said bar, as clearly shown in Figs. 1 and 3, whereby the forward end of the fender frame becomes supported upon said arms, in which position of parts the trip bar 20 is projected forward of the fender in a position to encounter any object on the track. Should the trip bar strike an object, it will slide rearwardly, and actuate the arms 17 to carry their upper ends from engagement with the cross bar 5, thereby removing the support for the fender frame and causing said frame to fall so that its forward end will lie upon the track, as shown in Fig. 2, and thus preventing the object which is struck from passing under the fender, even though it may be lying on the track directly in the path thereof. To restore the parts, the forward end of the fender frame is raised and the trip bar pulled outwardly so as to cause the upper ends of the arms 17 to again engage under the cross bar 5 when the forward end of the fender frame will be supported in its raised position, as before. It will be noted that when the trip bar 20 encounters an object on the track, the fender frame will be automatically dropped, obviating the necessity of any action on the part of the motorman, whose attention at such time may be wholly given to the stopping of the car.

To provide guards for the wheels, shoes 21 are pivoted at 22 to the lower ends of the hangers 4 and their rear ends pivotally connected by the links 23 with the rear ends of the side bars 2. By this arrangement when the fender frame is tripped and its forward end swings downward, as shown in Fig. 2, the guard shoes 21 will be swung downwardly at their forward ends onto the track in advance of the wheels 24. The restoration of the fender frame to its normal position will also restore said shoes to the position shown in Figs. 1 and 3.

Having thus fully set forth my invention, what I claim as new and desire to secure by Letters Patent, is:—

1. A fender comprising side bars pivoted at their rear ends, pivotally hung trip arms supporting said side bars, a fender frame pivoted upon the forward ends of the side bars, and a trip bar extending in front of the fender frame and connected with said arms.

2. A car fender comprising side bars pivoted at their rear ends, a fender frame pivotally mounted between the forward ends of said side bars, trip arms for supporting the side bars and fender frame, and a movable trip bar connected thereto and projecting in front of said fender frame.

3. A fender comprising side bars pivoted at their rear ends, a shaft supported in hangers from the car frame, trip arms on said shaft, a cross bar connecting said side bars adapted to be engaged by the trip arms to hold the forward end of the side bars in a raised position, a fender frame pivoted between the forward ends of the side bars, and a trip bar slidably mounted on the fender frame and adapted to actuate said trip arms.

4. A fender comprising side bars, a fender frame having side pieces pivoted between the forward ends of said side bars, a cross bar connecting the side pieces of the fender frame, a lever having an arm engaging said cross bar, and springs connecting the depending ends of the side pieces with said side bars.

5. A fender comprising side bars pivoted at their rear ends, trip arms for supporting the forward ends of the side bars in a raised position, a fender frame pivoted between the forward ends of the side bars, a trip bar carried by the fender frame for actuating the trip arms that support said side bars, and a pivoted guard shoe mounted in advance of each car wheel and connected with each side bar to be actuated by a dropping of the fender frame.

6. A fender comprising side bars pivoted at their rear ends and supported at their forward ends by trip arms, a fender frame carried by the forward ends of said side bars, means for actuating said trip arms to allow the forward end of said side bars and fender frame to fall, guard shoes in advance of the wheels, means connecting said shoes with said side bars to cause an actuation of said shoes by the dropping of the forward ends of said bars.

7. A fender comprising pivoted side bars, a fender frame having side pieces pivoted between the forward ends of said side bars, a cross bar engaging the side pieces of the fender frame near their points of pivot, a lever having an arm engaging said cross bar, pivoted trip arms supporting the pivoted side bars, and a trip bar mounted to slide on the fender frame and engaging said trip arms.

In testimony whereof, I sign this specification in the presence of two witnesses.

GEORGE H. BOLDUC.

Witnesses:
E. S. WHEELER,
I. G. HOWLETT.